(12) United States Patent
Gillis et al.

(10) Patent No.: US 6,439,201 B1
(45) Date of Patent: Aug. 27, 2002

(54) FUEL INJECTOR HAVING DUAL FLOW RATE CAPABILITIES AND ENGINE USING SAME

(75) Inventors: Edward R. Gillis; Dan R. Ibrahim, both of Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 34 days.

(21) Appl. No.: 09/742,570

(22) Filed: Dec. 20, 2000

(51) Int. Cl.[7] .................. F02M 45/00; F02M 47/00
(52) U.S. Cl. .............. 123/458; 123/496; 239/533.4
(58) Field of Search .................. 123/446, 457, 123/458, 496; 239/533.3–533.9

(56) References Cited

U.S. PATENT DOCUMENTS

| | | | | |
|---|---|---|---|---|
| 3,627,208 A | * | 12/1971 | Scott et al. | 239/533.5 |
| 3,747,857 A | * | 7/1973 | Fenne | 239/533.5 |
| 5,156,132 A | * | 10/1992 | Iwanaga | 213/496 |
| 5,517,972 A | * | 5/1996 | Stockner | 213/496 |
| 5,687,693 A | * | 11/1997 | Chen et al. | 123/446 |
| 6,024,296 A | * | 2/2000 | Wear et al. | 239/533.5 X |
| 6,113,012 A | * | 9/2000 | Wear et al. | 239/533.9 |
| 6,161,773 A | * | 12/2000 | Camplin et al. | 239/533.4 X |
| 6,168,096 B1 | * | 1/2001 | Potschin et al. | 239/533.3 |

\* cited by examiner

Primary Examiner—Tony M. Argenbright
(74) Attorney, Agent, or Firm—Liell & McNeil

(57) ABSTRACT

The present invention relates to fuel injectors having the ability to inject fuel at multiple pressures during an injection event. Traditional fuel injectors used in common rail fuel injection systems and unit pump fuel injection systems typically did not have the ability to inject fuel at multiple pressures during an injection event. However, engineers have learned that increased control over an injection event can lead to improved emissions by the fuel injectors. Therefore, the present invention utilizes an electronically controlled valve member that can direct. the flow of fuel through a fuel injector during an injection event between a relatively restricted passageway and a relatively unrestricted passageway. The present invention finds particular application in both common rail fuel injection systems and electronic unit pump fuel injection systems used in diesel engines.

18 Claims, 4 Drawing Sheets

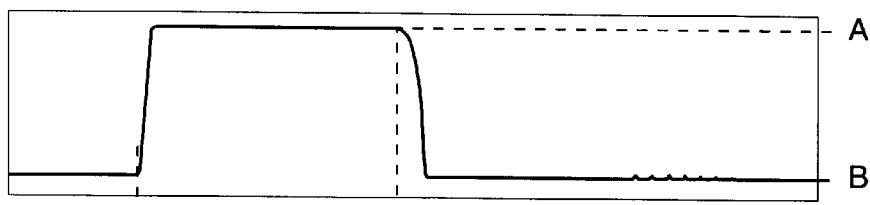
Fig-4a-
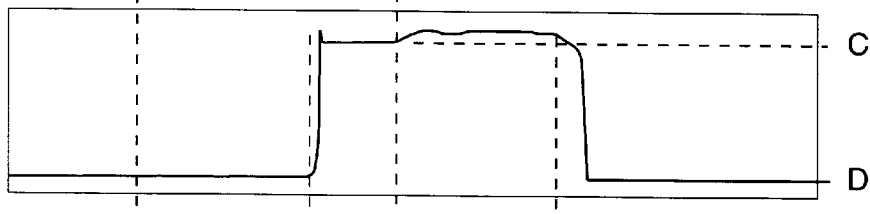
Fig-4b-
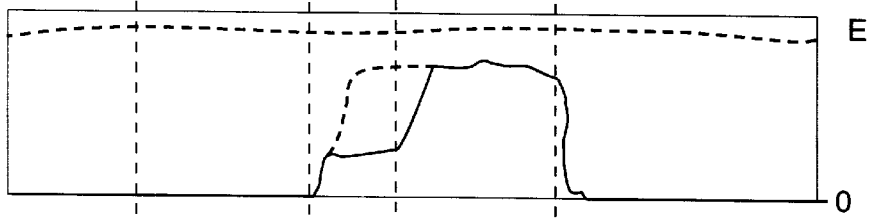
Fig-4c-
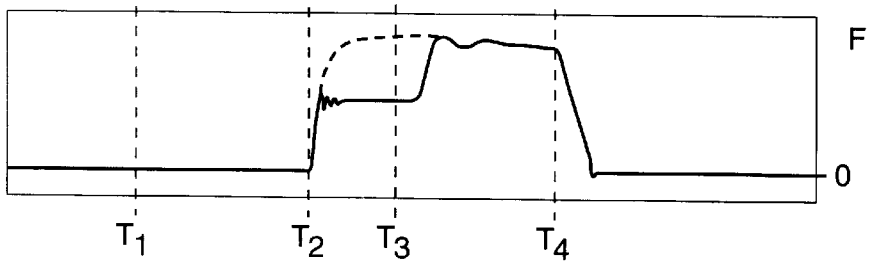
Fig-4d-

FUEL INJECTOR HAVING DUAL FLOW RATE CAPABILITIES AND ENGINE USING SAME

TECHNICAL FIELD

This invention relates generally to engines, and more particularly to fuel injectors with the ability to inject fuel at two different pressures during a single injection event.

BACKGROUND ART

High pressure common rail fuel injection systems and electronic unit pump fuel injection systems are becoming more widespread for use with diesel engines. Engineers have learned that improved control over the injection event of fuel injectors used in these and other fuel injection systems can reduce emissions produced during injection. One attempt at controlling the injection event is disclosed in U.S. Pat. No. 3,627,208, issued to Scott et al. on Dec. 14, 1971. Scott et al. teaches a fuel injector including a mechanically controlled pressure reducing valve that purports to control injection pressure during the injection event. The pressure reducing valve taught in Scott et al. purports to allow delivery of fuel to the nozzle outlet at either a relatively low pressure or a relatively high pressure. While the pressure reducing valve taught in Scott et al. has increased control over an injection event, there is room for improvement. For instance, it is believed that an even greater degree of control over the injection event can further improve emissions that are produced during an injection event.

The present invention is directed to overcoming one or more of the problems as set forth above.

DISCLOSURE OF THE INVENTION

In a first aspect of the present invention, an engine includes an engine housing. A plurality of fuel injectors are positioned within the engine housing, each of which has an injector body that defines a fuel inlet and a nozzle outlet. Attached to the injector body is an electronic actuator. An injection pressure control valve member is positioned in the injector body and is operably coupled to the electronic actuator. The injection pressure control valve member is movable between a first position in which the fuel inlet is fluidly connected to the nozzle outlet via a relatively restricted flow path, and a second position in which the fuel inlet is fluidly connected to the nozzle outlet via a relatively unrestricted flow path. A needle valve member is positioned in the injector body and is movable between a closed position blocking the nozzle outlet and an open position.

In another aspect of the present invention, a fuel injector includes an injector body that defines a fuel inlet that is separated from a nozzle outlet by at least two passageways. An electronically controlled valve is attached to the injector body and is movable between a first position in which one of the at least two passageways is closed and a second position in which said one is open. A needle valve member is positioned in the injector body and is movable between a closed position blocking the nozzle outlet and an open position.

In yet another aspect of the present invention, a method of controlling fuel injection includes providing an engine that includes a fuel injection system having a plurality of fuel injectors that each include an injector body that defines a fuel inlet and a nozzle outlet and is operably connected to an electrical actuator. The fuel inlet and the nozzle outlet of a first fuel injector are connected via a relatively restricted fuel passageway, in part by activating the electronic actuator. A first amount of fuel is the n injected from the first fuel injector. Next, t he fuel inlet and the nozzle outlet of the first fuel injector are connected via a relatively unrestricted fuel passageway, in part by deactivating the electronic actuator. A second amount of fuel is then injected from the first fuel injector.

BRIEF DESCRIPTION OF THE DRAWINGS

FIGS. 4a–d show control valve member position (4a), needle valve member position (4b), injection pressure (4c) and injection rate trace (4d) graphed versus time for a fuel injection event according to the present invention when utilized in a common rail fuel injection system.

BEST MODE FOR CARRYING OUT THE INVENTION

Figure 1:
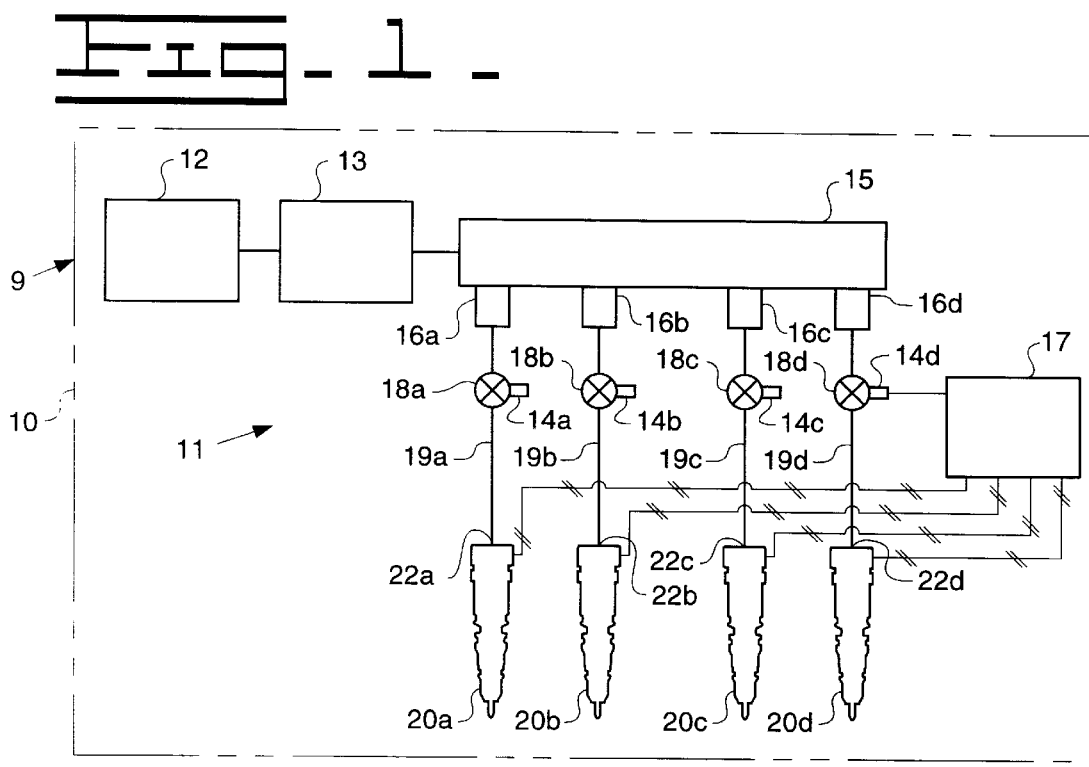
FIG. 1 is a schema tic representation of a high pressure common rail fuel injection system according to the present invention.

Referring to FIG. 1 there is shown a schematic representation of an engine 9 including a high pressure common rail fuel injection system 11 according to the present invention. Engine 9 includes an engine housing 10 that contains the various components of fuel injection system 11. Fuel injection system 11 includes a source of fuel 12, which is preferably a fuel tank, and a high pressure pump 13. Fuel from fuel tank 12 is pumped into a high pressure fuel manifold (common rail) 15 via high pressure pump 13. Included on high pressure manifold 15 are a plurality of fuel outlets 16a–d, each of which is in fluid communication with a fuel inlet 22 of a fuel injector 20a–d, via a high pressure supply line 19a–d. A two position electronic control valve 18a–d that includes an electronic actuator 14a–d is preferably operably connected to an electronic control module 17 and positioned between high pressure manifold 15 and each fuel injector 20a–d. When electronic actuator 14a is activated, electronic control valve 18a is moved to its open position and fuel from high pressure fuel manifold 15 can flow into fuel injector 20a via high pressure supply line 19a. When the electronic actuator 14a is deactivated, electronic control valve 18a returns to its closed position and fuel flow to fuel injector 20a is ended, thus allowing the injection event for that injector to end. Fuel flow into each of fuel injectors 20b–d is controlled in a similar manner. Preferably only one electronic actuator 14a–d is activated at any time during operation of fuel injection system 11, such that only one fuel injector 20a–d will inject fuel into the combustion space at a time.

Figure 2:
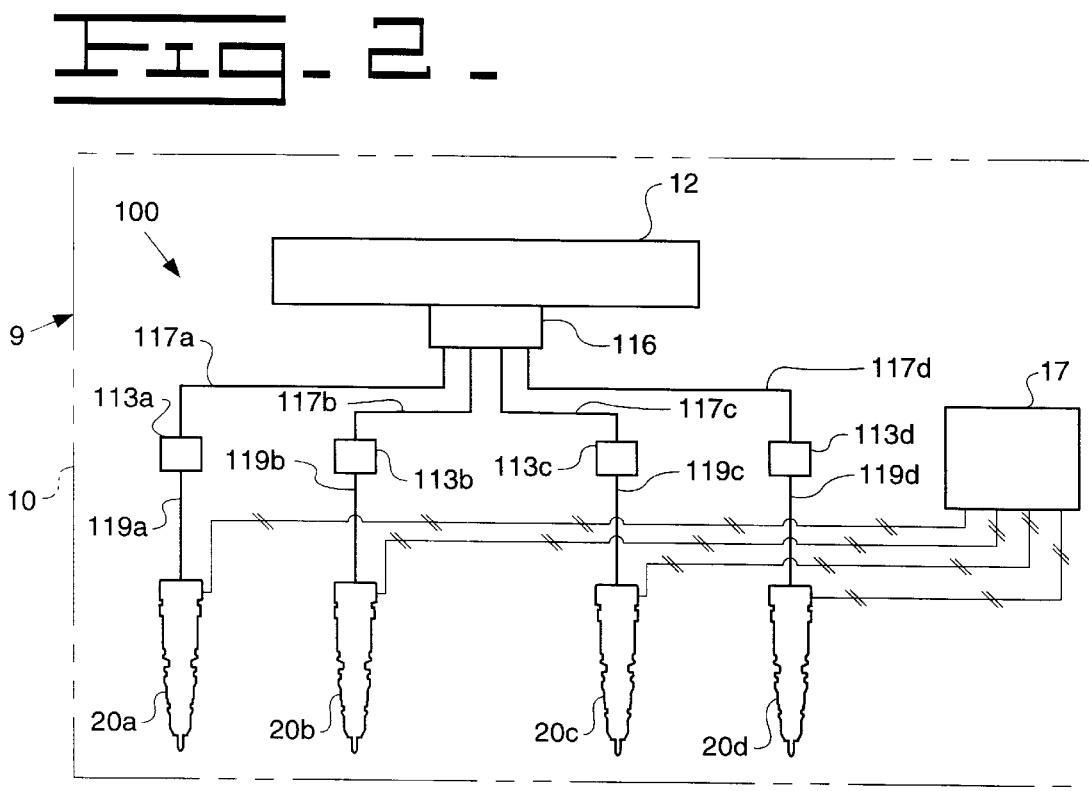
FIG. 2 is a schematic representation of an electronic unit pump fuel injection system according to the present invention.

Referring to FIG. 2, there is shown engine 9 including an electronic unit pump fuel injection system 100 according to the present invention. Fuel injection system 100 includes a fuel source 12 that has a fuel outlet 116. Fuel outlet 116 is in fluid communication with a plurality of high pressure unit pumps 113a–d via fuel supply lines 117a–d. Note that unlike fuel injection system 11, which included only one high pressure pump 13 to supply high pressure fuel to a common high pressure manifold 15, fuel injection system 100 includes a number of high pressure pumps 113a–d that is equal to the number of fuel injectors 20a–d for the system. Therefore, when an individual high pressure pump 113, such as high pressure pump 113a, pumps fuel from fuel tank 12, it is supplied to an individual fuel injector 20a via a high pressure supply line 119a. As with fuel injection system 11, preferably only one fuel injector 20a–d injects fuel at a given time during operation of fuel injection system 100 because only one high pressure pump 113a–d is preferably pumping fuel from fuel tank 12 at a time. Also included in fuel injection system 100 is an electronic control module 17 that is operably connected to an electronic actuator 30 of each fuel injector 20.

Figure 3:
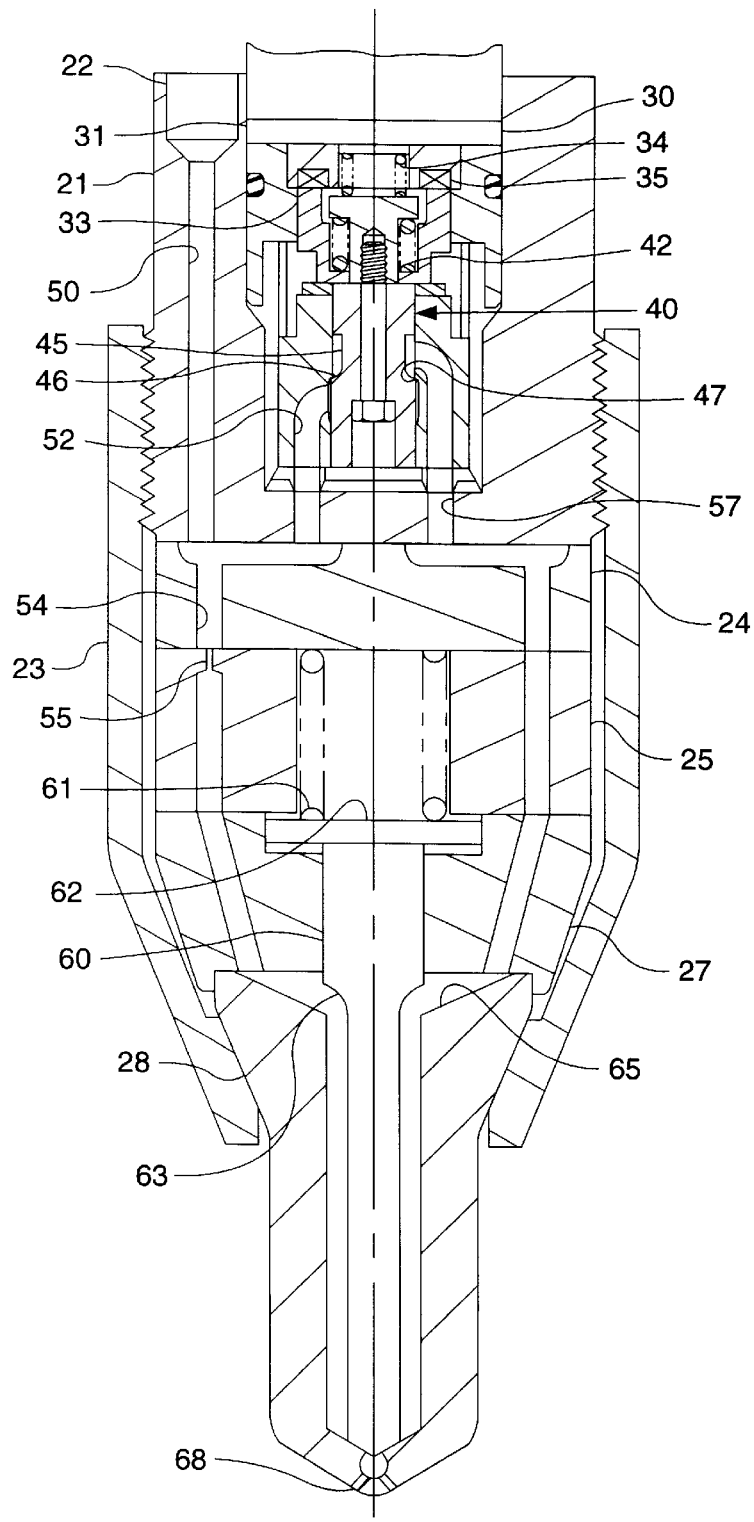
FIG. 3 is a diagrammatic representation of a fuel injector according to the present invention for use with either of the FIG. 1 or FIG. 2 fuel injection systems.

Referring to FIG. 3 there is shown a sectioned diagrammatic view of a fuel injector 20 according to the present invention. Fuel injector 20 can be used in either high pressure common rail fuel injection system 11 or unit pump fuel injection system 100 without modification. Fuel injector 20 includes an injector body or body assembly, generally designated 21, that has a number of components including an adapter 24, a spacer 25 and a body guide 27 that are attached to one another as illustrated. A casing 23 acts as an interaction between these components and a tip component 28 of injector body 21 that defines a nozzle outlet 68. Injector body 21 defines a fuel inlet 22 and a high pressure passage 50 that are in fluid communication with high pressure fuel rail 15 when electronic actuator 14 is activated, if fuel injector 20 is operating in fuel injection system 11. Alternatively, if fuel injector 20 has been incorporated into fuel injection system 100, fuel inlet 22 and high pressure passage 50 are fluidly connected to fuel source 12 when high pressure pump 113 begins pumping fuel from the source. High pressure passage 50 includes a first fuel passageway 54, a second fuel passageway 57 and a bypass passageway 52.

An electronic actuator 30, preferably a two position solenoid 31, is attached to fuel injector 20 and includes an armature 33, a biasing spring 34 and a coil 35. Armature 33 is attached to an injection pressure control valve member 40 that is positioned in injector body 21. Electronic actuator 30 is operably connected to electronic control module 17. Those skilled in the art will appreciate that actuator 30 and valve 40 could be any suitable electronically controlled valve, such as a pilot operated piezoelectric valve, but is preferably a two-way control valve of the type currently known in the art and utilized by Caterpillar Inc. and others in connection with mechanically-actuated, electronically-controlled unit injectors. Injection pressure control valve member 40 is biased toward a downward, retracted position by biasing springs 34. When control valve member 40 is in this position, a valve surface 46 included on control valve member 40 is away from contact with a valve seat 47, that is included on injector body 21. When valve seat 47 is open, an annulus 45 defined by injection pressure control valve member 40 opens fuel inlet 22 to second fuel passageway 57 via bypass passageway 52. When solenoid 31 is activated, armature 33 act to move the control valve member 40 toward an upward, advanced position. When control valve member 40 is in this position, valve surface 46 closes valve seat 47 and fuel inlet 22 is blocked from fluid communication with second fuel passageway 57. When solenoid 31 is deactivated, control valve member 40 can return to its retracted, biased position under the force of biasing spring 34.

As illustrated in FIG. 3, fuel inlet 22 is always open to first fuel passageway 54, which includes a control orifice 55. Control orifice 55 preferably has a uniform cylindrical shape and has a restricted flow area relative to the flow area of second fuel passageway 57 and a nozzle flow area of nozzle outlet 68. Control orifice 55 is preferably cylindrical because it is easier to control the effect that it will have on the injection event. When injection pressure control valve member 40 is in its advanced position, fuel entering fuel injector 20 via fuel inlet 22 can only flow toward nozzle outlet 68 through first fuel passageway 54. However, when injection pressure control valve member 40 is in its retracted position, fuel inlet 22 is also open to nozzle outlet 68 via second fuel passageway 57, which has a relatively unrestricted flow area. Therefore, depending upon the position of injection pressure control valve member 40, fuel inlet 22 is connected to nozzle outlet 68 by either a relatively restricted flow path, including only first fuel passageway 54, or a relatively unrestricted flow path, including in addition bypass passageway 52 and second fuel passageway 57.

When fuel inlet 22 is opened to second fuel passageway 57 during an injection event, injection pressure will increase because an amount of high pressure fuel entering fuel inlet 22 is now flowing through a passageway that does not include a flow restriction. It should be appreciated that the difference between injection pressure when only first fuel passageway 54 is open to fuel inlet 22 and when second fuel passageway 57 is also open to fuel inlet 22 is directly influenced by the difference between the flow area through control orifice 55 and the flow area of second fuel passageway 57. For instance, the closer that the flow area of control orifice 55 is to the flow area of second fuel passageway 57, the less dramatic the increase in injection pressure will be when injection pressure control valve member 40 opens fuel inlet 22 to second fuel passageway 57. However, it should be appreciated that if control orifice 55 is too large, it will have little or no effect on the injection event. Similarly, if control orifice 55 is too small, the injector may not be able to sustain the injection event and needle valve chatter could result.

To determine the approximate size of control orifice 55 that should be used, desired injection pressure must first be determined. The size of control orifice 55 can then be approximately calculated by inserting the known rail pressure and injection pressure into standard fluid relation equations. For instance, if the desired injection pressure is to be about one half of the rail pressure, control orifice 55 should be about the size of nozzle outlet 68. However, because fuel is not an incompressible fluid, the control orifice 55 might have to be machined to be a little larger or a little smaller than calculated.

Returning now to fuel injector 20, a needle valve member 60 is positioned in injector body 21 and is movable between a closed position, in which nozzle outlet 68 is blocked from fuel inlet 22 and an open position in which nozzle outlet 68 is fluidly connected to fuel inlet 22. Needle valve member 60 is biased toward its closed position by a biasing spring 61 that exerts a downward force on a closing surface 62 that is included on needle valve member 60. When electronic actuator 14 is deactivated and fuel inlet 22 is blocked from fluid communication with high pressure fuel manifold 15, little or no fluid pressure exists within nozzle chamber 65. The force of biasing spring 61 is therefore sufficient to maintain needle valve member 60 in its closed position. When fuel inlet 22 is fluidly connected to high pressure fuel manifold 15, and control valve member 40 is positioned to block second fuel passageway 57 from fuel inlet 22, such as at the beginning of an injection event, fuel pressure within nozzle chamber 65 begins to rise. When the fuel pressure in the nozzle chamber 65 reaches a valve opening pressure, needle valve member 60 is lifted toward its open position to fluidly connect fuel inlet 22 to nozzle outlet 68. High pressure fuel can then spray into the combustion space. When electronic actuator 30 is deactivated, fuel inlet 22 is open to second fuel passageway 57 via bypass passageway 52. This will result in an increase in the pressure in the nozzle chamber 65 and a corresponding increase in the injection pressure of fuel being sprayed into the combustion space, as well as an increase in the amount of fuel being sprayed into the combustion space.

Industrial Applicability

Referring to FIGS. 1 and 3, prior to an injection event for a given fuel injector 20, electronic actuator 14 is deactivated such that fuel is unable to flow from high pressure fuel rail 15 into fuel inlet 22, solenoid 31 is deactivated, injection pressure control valve member 40 is positioned in its downward, retracted position and valve surface 46 is out of contact with valve seat 47 to open fuel inlet 22 to second fuel passageway 57. Needle valve member 60 is positioned in its closed position by the action of biasing spring 61 to close fuel inlet 22 from nozzle outlet 68.

Just prior to the initiation of an injection event, solenoid 31 is activated to move injection pressure control valve member 40 to its upward position to close valve seat 47. Fuel inlet 22 is now blocked from fluid communication with second passageway 57. The injection event is initiated when electronic actuator 14 is activated to allow fuel from high pressure fuel rail 15 to begin flowing into fuel injector 20 via fuel inlet 22. Because injection pressure control valve member 40 is in its advanced position closing valve seat 47, fuel inlet 22 is fluidly connected to nozzle chamber 65 by only first fuel passageway 54. Recall that at the beginning of an injection event, because first fuel passageway 54 includes control orifice 55, fuel flowing toward nozzle outlet 68 is flowing through a relatively restricted passageway. As fuel flows into nozzle chamber 65, fuel pressure within nozzle chamber 65 begins to increase. When fuel pressure in the nozzle chamber 65 exceeds a valve opening pressure, needle valve member 60 is moved upward toward its advanced position, nozzle outlet 68 is opened to fuel inlet 22 and fuel spray into the combustion space can begin. Fuel injection continues at this reduced rate and pressure until solenoid 31 is deactivated.

When full fuel injection is desired, solenoid 31 is deactivated and injection control valve member 40 returns to its downward, biased position under the action of biasing spring 34. Injection control valve member 40 is aided in this downward movement by the high pressure fuel force acting on valve surface 46 in bypass passageway 52. As injection control valve member 40 retracts, fuel inlet 22 becomes fluidly connected to second fuel passageway 57 via bypass passageway 52. Fuel from fuel inlet 22 can now flow into nozzle chamber 65 via a relatively unrestricted fuel passageway including first fuel passageway 54, bypass passageway 52 and second fuel passageway 57. Because second fuel passageway 57 does not include a flow restriction, nozzle chamber 65 receives a greater amount of fuel, at a higher pressure, from this passageway than it could receive from first fuel passageway 54 alone, or from addition of another restricted passageway. Therefore, both injection pressure and injection rate will be increased relative to the increase in amount and pressure of fuel flowing to nozzle outlet 68. It should be appreciated that when second fuel passageway 57 is open to fuel inlet 22, injection pressure will be approximately equal to rail pressure. However, due to friction and other losses, injection pressure will be at least slightly less.

Just prior to the desired end of the injection event, electronic actuator 14 is deactivated and fuel flow to fuel injector 20 is ended. Fuel pressure within nozzle chamber 65 then drops as the remainder of fuel already present in fuel injector 20 continues exiting nozzle outlet 68. Once the fuel pressure within nozzle chamber 65 drops to below a valve closing pressure, needle valve member 60 will be returned to its closed position under the action of biasing spring 61 and fuel spray into the combustion space will be ended. While this particular fuel injector 20 is preparing to end injection, another fuel injector is preparing to inject fuel in the manner described above. Therefore, while the various components of this fuel injector 20 are resetting themselves in preparation for the next injection event, at least one of the subsequent fuel injectors is injecting fuel into the combustion space. Recall that while each fuel injector is activated and injects fuel in a like manner, preferably only one fuel injector is injecting fuel at any given time during operation of fuel injection system 11.

Referring in addition to FIGS. 4a–d, control valve member position, needle valve member position, injection pressure and injection rate trace have been graphed versus time, respectively, for fuel injector 20 and fuel injection system 11. Prior to an injection event, at $T_1$, when solenoid 31 is activated, control valve member 40 moves from its downward position opening valve seat 47(B), to its upward position to close valve seat 47(A), as illustrated in FIG. 4a. When electronic control valve 18 moves to its open position to allow fuel flow to fuel injector 20, at $T_2$, needle valve member 60 is moved from its closed position (D) to its open position (C) by the increased fuel pressure in the nozzle chamber, as illustrated in FIG. 4b.

When solenoid 31 is deactivated, at $T_3$, and injection pressure control valve member 40 returns to a position to open valve seat 47(B), both injection pressure and injection rate experience a sharp increase toward their maximum, illustrated as (E) and (F) for FIGS. 4c and 4d respectively. This occurs because the flow to the needle is no longer restricted by the opening of the bypass passageway. Note that rail pressure has been illustrated as the dashed line graph in FIG. 4c. As expected, while injection pressure, graphed as the solid line, approaches rail pressure once solenoid 31 is deactivated, it does not reach or exceed this pressure. When electronic control valve 18 moves to its closed position, at $T_4$, needle valve member 60 is returned to its closed position due to the reduced pressure in the nozzle chamber, as illustrated in FIG. 4b. As illustrated in FIGS. 4a–d, injection pressure control valve member 40 and solenoid 31 allow the present invention to create a boot shaped injection event, as shown FIG. 4d. However, it should be appreciated that fuel injector 20 would still inject fuel satisfactorily if solenoid 31 were not activated during an injection event. However, instead of creating a boot shaped rate trace, a square rate trace would be created. The dotted lines between times $T_2$ and $T_3$ show how the injection event would differ if solenoid 31 were not energized during the event.

Referring to FIGS. 2 and 3, operation of fuel injection system 100 will be described. It should be appreciated that while the components of fuel injector 20 will function as described above, the injection process for each fuel injector 20 is initiated and ended in a different manner when used in fuel injection system 100. Therefore, fuel injector 20 will display somewhat different injection characteristics when used in electronic unit pump fuel injection system 100 than those found when the same fuel injector was used with high pressure common rail fuel injection system 11. An injection event for a particular fuel injector 20 is initiated when its corresponding high pressure fuel pump 113 begins pumping fuel from fuel source 12. Fuel inlet 22 is now fluidly connected to fuel source 12 via fuel supply line 117 and high pressure fuel supply line 119. However, because fuel is being supplied to fuel inlet 22 directly from high pressure pump 113, as opposed to a high pressure fuel reservoir as in fuel injection system 11, fuel pressure within fuel injector 20 is steadily increasing.

As with fuel injection system 11, fuel injection from any fuel injector 20 in fuel injection system 100 begins when the pressure in the nozzle chamber exceeds a valve opening pressure. Needle valve member 60 is then lifted to its open position and fuel can spray into the combustion chamber. Because injection pressure control valve member 40 is positioned in its advanced position, fuel inlet 22 is fluidly connected to nozzle chamber 65 and nozzle outlet 68 by first fuel passageway 54, which is restricted. When solenoid 31 is deactivated, injection pressure control valve member 40 returns to its retracted position to open fuel inlet 22 to second fuel passageway 57(unrestricted) via annulus 45 and bypass passageway 52. The amount and pressure of fuel flowing out of nozzle outlet 68 is then increased such that injection flow rate and pressure can increase in a corresponding manner. Once again, it should be appreciated that fuel injector 20 would still perform satisfactorily if injection pressure control valve member 40 remained in its downward position to open fuel inlet to second fuel passageway 57 for the entire injection event.

When the desired amount of fuel has been injected by fuel injector 20, a signal is sent for high pressure fuel pump 113 to quit pumping fuel to fuel injector 20. With fuel supply ended, pressure within nozzle chamber 65 drops to below a valve closing pressure and needle valve member 60 returns to its closed position under the action of biasing spring 61 to end the injection event. Only one fuel injector 20 of fuel injection system 100 is preferably injecting fuel at a time, as with fuel injection system 11. Therefore, when high pressure pump 113 stops pumping fuel to fuel injector 20, another high pressure pump 113 is beginning to pump fuel into its corresponding fuel injector 20. In other words, when high pressure pump 113a ends fuel flow to fuel injector 20a, fuel injection from fuel injector 20a is ended and the various components of the injector begin to reset themselves for the next injection event. At the same time, high pressure pump 113b is beginning to pump fuel into fuel injector 20b to allow fuel injector 20b to begin injecting fuel shortly after the end of injection from fuel injector 20a.

Figure 5A:
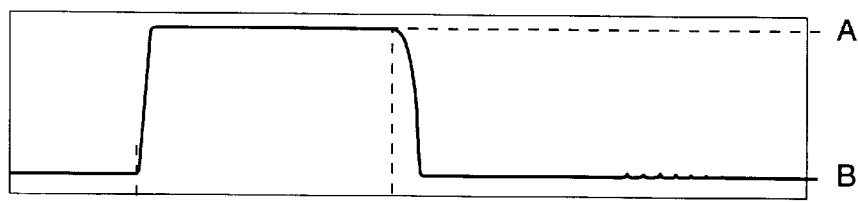
FIGS. 5a–d show control valve member position (5a), needle valve member position (5b), fuel pressure (5c) and injection rate trace (5d) graphed versus time for an injection event according to the unit pump version of the present invention.
Figure 5B:
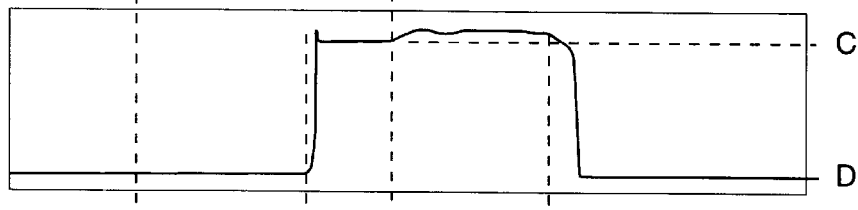

Referring in addition to FIGS. 5a–d, control valve member position, needle valve member position, injection pressure and injection rate trace have been graphed versus time, respectively, for fuel injector 20 and fuel injection system 100. When viewed together, the effect that the relative positioning of injection pressure control valve member 40 and needle valve member 60 have on injection rate trace and injection pressure in this fuel injection system can be appreciated. Note that FIGS. 5a–b are substantially similar to FIGS. 4a–b, as expected, because control valve member 40 and needle valve member 60 function in a similar manner when fuel injector 20 is incorporated into either common rail fuel system 11 or electronic unit pump system 100. Prior to an injection event, at $T_1$, when solenoid 31 is activated, control valve member 40 moves from its downward position opening valve seat 47(B), to its upward position to close valve seat 47(A), as illustrated in FIG. 5a. Time $T_2$ corresponds to the beginning of the pumping stroke of the unit pump 113 for that particular injector 20. When the pressure in the nozzle chamber exceeds a valve opening pressure, at $T_3$, needle valve member 60 is moved from its closed position (D) to its open position (C) and fuel injection can begin, as illustrated in FIG. 5b.

Figure 5C:
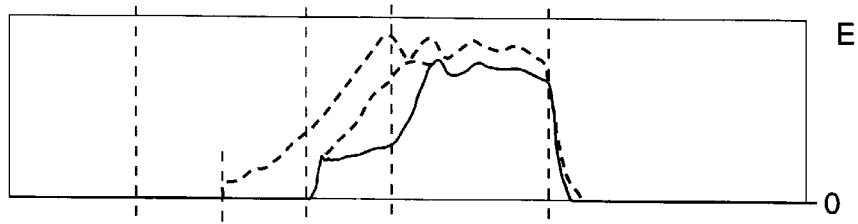
Figure 5D:
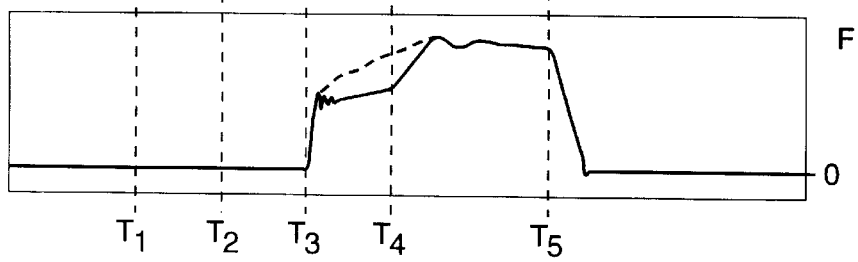

When solenoid 31 is deactivated, at $T_4$, and injection pressure control valve member 40 returns to a position to open valve seat 47(B), both injection pressure and injection rate experience an increase toward their maximum, illustrated as (E) and (F) for FIGS. 5c and 5d respectively. Note however, that the increase in injection pressure and injection rate for fuel injection system 100 is not as sharp as that for fuel injection system 11, illustrated in FIGS. 4c and d. In addition, fuel pressure in high pressure supply line 119 has been included as the dashed line graph in FIG. 5c. Note that pressure in high pressure supply line 119 gradually increases as pump 113 begins to pump. Further, as illustrated in FIG. 5c, while injection pressure approaches supply line pressure once solenoid 31 is deactivated, it does not reach or exceed this value, as expected. When pump 113 is deactivated, at $T_5$, needle valve member 60 is returned to its closed position (D) as a result of the reduced pressure in the nozzle chamber, and injection pressure and injection rate fall off dramatically as the injection event comes to an end (FIGS. 5b–d) As illustrated in FIGS. 5a–d injection pressure control valve member 40 and solenoid 31 allow the present invention to create a boot shaped injection event, as shown in FIG. 5d. However, it should be appreciated that fuel injector 20 would still inject fuel satisfactorily if solenoid 31 were not activated during an injection event. This change in the injection event is illustrated by the dotted line between times $T_3$ and $T_4$. However, instead of creating a boot shaped rate trace, a ramp plus square rate trace would be created.

The present invention can be used to create more flexible rate shaping for fuel injectors used in high pressure common rail and electronic unit pump fuel injection systems. This additional rate shaping flexibility can allow engineers to configure either type of fuel injection system such that undesirable emissions can be reduced. Additionally, because rate shaping flexibility for these fuel injection systems has been increased, the present invention can lead to more efficient fuel consumption in both fuel injection systems.

It should be understood that the above description is intended for illustrative purposes only, and is not intended to limit the scope of the present invention in any way. For instance, while the high pressure common rail fuel injection system has been illustrated as having a separate electronic control valve to connect each fuel injector to the high pressure rail, the fuel injection system could instead include a single electronically controlled switch that opened only one fuel injector to the high pressure rail at a time. Further, while the injection pressure control valve member has been described as being controlled in its movement by a two position solenoid, it should be appreciated that other electronic controls could instead be used. The control valve member could instead be controlled by a piezoelectric actuator or by a solenoid having three or more positions. In addition, those skilled in the art will recognize that this invention is equally applicable to fuel systems in which fuel is delivered from a source other than a high pressure manifold or rail, such unit pump systems (mechanical or electronic), pump-line-nozzle systems, and even unit injector systems (in which the injector described herein would form part of a unit injector). Thus, those skilled in the art will appreciate that other aspects, objects and advantages of this invention can be obtained from a study of the drawings, the disclosure and the appended claims.

What is claimed is:

1. An engine comprising:

an engine housing;

a plurality of fuel injectors positioned within said engine housing, each including an injector body defining a fuel inlet and a nozzle outlet;

an electronic actuator attached to said injector body;

an injection pressure control valve member positioned in said injector body and operably coupled to said electronic actuator, and being movable between a first position in which said fuel inlet is fluidly connected to said nozzle outlet via a relatively restricted flow path, and a second position in which said fuel inlet is fluidly connected to said nozzle outlet via a relatively unrestricted flow path; and a needle valve member positioned in said injector body and being movable between a closed position blocking said nozzle outlet and an open position.

2. The engine of claim 1 wherein said restricted flow path includes a control orifice; and said unrestricted flow path includes said restricted flow path and a bypass passageway.

3. The engine of claim 1 wherein said electronic actuator includes an armature attached to said injection pressure control valve member.

4. The engine of claim 1 wherein said nozzle outlet has a nozzle flow area; and said restricted flow path has a minimum flow area at a control location, and said minimum flow area is a function of said nozzle flow area.

5. The engine of claim 1 wherein said unrestricted flow path includes a passageway that is closed when said injection pressure control valve member is said first position, but open when said injection pressure control valve member is in said second position.

6. The engine of claim 1 wherein said injection pressure control valve member is biased toward said second position by a spring.

7. A fuel injector comprising:

an injector body defining a fuel inlet separated from a nozzle outlet by at least two passageways;

an electronically controlled valve attached to said injector body and being movable between a first position in which one of said at least two passageways is closed, and a second position in which said one is open; and a needle valve member positioned in said injector body and being movable between a closed position blocking said nozzle outlet and an open position.

8. The fuel injector of claim 7 wherein an other of said at least two passageways includes a flow restriction relative to said one of said at least two passageways.

9. The fuel injector of claim 8 wherein said flow restriction is a control orifice with a restricted flow area.

10. The fuel injector of claim 9 wherein said nozzle outlet has a nozzle flow area; and said restricted flow area is a function of said nozzle flow area.

11. The fuel injector of claim 10 wherein said control orifice has a uniform cylindrical shape.

12. The fuel injector of claim 11 wherein said electronically controlled valve is biased toward said second position by a spring.

13. The fuel injector of claim 12 wherein said electronically controlled valve includes a solenoid with an armature.

14. A method of controlling fuel injection comprising:

providing an engine including a fuel injection system having a plurality of fuel injectors that include an injector body operably connected to an electronic actuator and defining a fuel inlet and a nozzle outlet;

connecting said fuel inlet and said nozzle outlet of a first fuel injector via a relatively restricted fuel passageway, in part by activating said electronic actuator;

injecting a first amount of fuel from said first fuel injector;

connecting said fuel inlet and said nozzle outlet of said first fuel injector via a relatively unrestricted fuel passageway, in part by deactivating said electronic actuator; and injecting a second amount of fuel from said first fuel injector.

15. The method of claim 14 wherein said step of connecting said fuel inlet and said nozzle outlet of said first fuel injector via a relatively restricted fuel passageway includes moving an injection pressure control valve member to a first position in which a valve surface of said injection pressure control valve member is in contact with a valve seat defined by said injector body.

16. The method of claim 15 wherein said nozzle outlet has a nozzle flow area; and said step of connecting said fuel inlet and said nozzle outlet of said first fuel injector via a relatively restricted fuel passageway includes channeling fuel through a restricted flow path that has a restricted flow area that is a function of the nozzle flow area.

17. The method of claim 16 wherein said step of connecting said fuel inlet and said nozzle outlet of said first fuel injector via a relatively unrestricted fuel passageway includes moving said injection pressure control valve member to a second position in which said valve surface is out of contact with said valve seat.

18. The method of claim 17 wherein said step of connecting said fuel inlet and said nozzle outlet of said first fuel injector via a relatively unrestricted fuel passageway includes channeling fuel through said relatively restricted fuel passageway and through a relatively unrestricted fuel passageway.

* * * * *